US012162120B2

(12) United States Patent
Eggert et al.

(10) Patent No.: US 12,162,120 B2
(45) Date of Patent: *Dec. 10, 2024

(54) SOCKET DRIVE IMPROVEMENT

(71) Applicant: Snap-on Incorporated, Kenosha, WI (US)

(72) Inventors: Daniel M. Eggert, Kenosha, WI (US); Christopher D. Thompson, Franklin, WI (US); Gene E. Olson, Kenosha, WI (US); Jeffrey M. Arendt, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,186

(22) Filed: Nov. 8, 2022

(65) Prior Publication Data

US 2023/0083975 A1 Mar. 16, 2023

Related U.S. Application Data

(63) Continuation of application No. 16/918,712, filed on Jul. 1, 2020, now Pat. No. 11,806,843, which is a continuation-in-part of application No. 16/504,718, filed on Jul. 8, 2019, now Pat. No. 11,173,580, which is a continuation of application No. 15/634,697, filed on Jun. 27, 2017, now Pat. No. 10,442,060, which is a continuation of application No. 14/309,954, filed on Jun. 20, 2014, now Pat. No. 9,718,170.

(Continued)

(51) Int. Cl.
*B25B 13/06* (2006.01)

(52) U.S. Cl.
CPC .................................. *B25B 13/065* (2013.01)

(58) Field of Classification Search
CPC ........ B25B 13/06; B25B 13/065; B25B 13/08
See application file for complete search history.

(56) References Cited

U.S. PATENT DOCUMENTS 2,685,219 A 8/1954 Diebold
2,969,250 A 1/1961 Kull
(Continued)

FOREIGN PATENT DOCUMENTS

CN 2178160 Y 9/1994
CN 2276859 Y 3/1998
(Continued)

OTHER PUBLICATIONS

Examination Report No. 3 for corresponding Application No. 2021202775 dated Mar. 29, 2023, 3 pages.
(Continued)

*Primary Examiner* — David B. Thomas
(74) *Attorney, Agent, or Firm* — Taft Stettinius & Hollister LLP

(57) ABSTRACT

Tools, for example, hexagon sockets, dodecagonal sockets, splined sockets, wrenches, etc., that have inner surface geometries adapted to engage a flank of a fastener at a point away from a corner of the fastener. This increases the strength and life of the socket, reduces a risk of the fastener becoming locked or stuck in the socket, and reduces the risk of the fastener being stripped or the socket slipping on the fastener.

24 Claims, 15 Drawing Sheets

Related U.S. Application Data

(60) Provisional application No. 61/904,754, filed on Nov. 15, 2013.

(56) References Cited

U.S. PATENT DOCUMENTS 3,125,910 A 3/1964 Kavalar
3,242,775 A 3/1966 Hinkle
3,273,430 A 9/1966 Knudsen et al.
3,466,956 A * 9/1969 Bowers ................ B25B 13/065 81/124.6
3,675,516 A 7/1972 Knudsen
3,908,488 A 9/1975 Andersen
4,512,220 A 4/1985 Barnhill
4,581,957 A 4/1986 Dossier
4,646,594 A 3/1987 Tien
4,765,211 A 8/1988 Colvin
4,882,957 A 11/1989 Wright et al.
4,930,378 A 6/1990 Colvin
5,012,706 A 5/1991 Wright
5,092,203 A 3/1992 Mader
5,117,714 A * 6/1992 Pagac .................... B25B 13/00 81/119
5,174,704 A * 12/1992 Kazino ................ F16B 23/003 81/121.1
5,219,392 A 6/1993 Ruzicka et al.
5,284,073 A 2/1994 Wright et al.
5,388,486 A 2/1995 Ruzicka
5,406,868 A * 4/1995 Foster .................... B25B 13/08 81/186
5,476,024 A 12/1995 Hsieh
5,481,948 A 1/1996 Zerkovitz
5,595,096 A * 1/1997 Coffman .............. B25B 13/065 81/186
5,832,792 A 11/1998 Hsieh
5,878,636 A 3/1999 Baker
6,079,299 A 6/2000 Sundstrom
6,082,228 A 7/2000 Macor
6,098,501 A 8/2000 Sundstrom
6,131,492 A * 10/2000 Mai ........................ B25B 13/08 81/119
6,263,769 B1 7/2001 Macor
6,354,175 B1 3/2002 Dobson et al.
6,655,888 B2 12/2003 Schultz
6,668,686 B1 12/2003 Hsien
6,745,649 B1 6/2004 Liao
6,820,521 B2 11/2004 Dobson
6,938,524 B2 9/2005 Hsien
6,962,100 B2 11/2005 Hsien
7,000,505 B2 2/2006 Hsien
7,168,347 B2 1/2007 Hsieh
7,226,262 B2 6/2007 Schultz
7,228,764 B1 6/2007 Macor
7,261,020 B2 8/2007 Hsieh
7,270,032 B1 9/2007 Hsieh
7,311,021 B2 12/2007 Macor
7,331,260 B2 2/2008 Chen
7,331,744 B2 2/2008 Schultz
7,340,982 B2 3/2008 Wright
7,437,975 B1 10/2008 De Anfrasio
7,437,977 B2 10/2008 Hsieh
7,661,339 B2 2/2010 Wu
8,056,448 B2 11/2011 Chen
8,245,603 B2 * 8/2012 Piper .................... B25B 13/065 81/186
8,667,873 B2 3/2014 Hsieh
8,752,455 B1 * 6/2014 Taylor, Jr. ............ B25B 13/107 81/DIG. 11
8,973,471 B2 3/2015 Hsieh
9,718,170 B2 8/2017 Eggert
10,442,059 B2 * 10/2019 Milligan ............ B25B 23/0035
10,442,060 B2 10/2019 Eggert
11,701,757 B2 * 7/2023 Kukucka .............. B25B 15/005 81/461
11,780,059 B2 * 10/2023 Milligan .............. B25B 13/065 81/121.1
11,806,843 B2 * 11/2023 Eggert ................. B25B 13/065
2002/0039523 A1 4/2002 Hartman
2002/0104409 A1 8/2002 Hu
2003/0126960 A1 7/2003 Chen
2004/0020332 A1 2/2004 Hsieh
2004/0093996 A1 5/2004 Fu
2004/0121845 A1 6/2004 Delaney et al.
2004/0163504 A1 8/2004 Chen
2006/0090610 A1 5/2006 Liao
2006/0130618 A1 7/2006 Hsieh
2006/0150782 A1 7/2006 Hsieh
2006/0156869 A1 7/2006 Hsieh
2006/0272457 A1 12/2006 Macor
2007/0044595 A1 3/2007 Macor
2007/0084314 A1 4/2007 Harker
2007/0137441 A1 6/2007 Wright
2008/0006126 A1 1/2008 Hsieh
2008/0060483 A1 3/2008 Macor
2008/0148906 A1 6/2008 Wu
2009/0133539 A1 5/2009 Cheng
2009/0235788 A1 9/2009 Hsieh
2009/0285653 A1 11/2009 Schultz
2010/0224035 A1 9/2010 Hu
2011/0197718 A1 8/2011 Meholovitch
2011/0259158 A1* 10/2011 Richardson ........... B25B 13/065 81/124.4
2011/0290085 A1* 12/2011 Richardson ........... B25B 13/065 81/119
2011/0290086 A1 12/2011 Chiu
2012/0189980 A1* 7/2012 Kuehne ................ A61C 8/0018 433/141
2014/0251092 A1* 9/2014 Taylor, Jr. ............... B25B 13/56 81/185
2015/0027278 A1* 1/2015 Lee ........................ B25B 23/00 81/119
2015/0135910 A1 5/2015 Eggert et al.
2017/0363129 A1 12/2017 Bada
2019/0275646 A1 9/2019 Liu
2020/0070321 A1 3/2020 Schulz

FOREIGN PATENT DOCUMENTS

CN 2291994 Y 9/1998
CN 101066587 A 11/2007
CN 101168246 A 4/2008
CN 102765068 A 11/2012
DE 1603963 9/1970
EP 2478864 A2 7/2012
GB 2501181 A 10/2013
GB 2520435 5/2015
JP S5046851 U 5/1975
TW 249372 6/1995
TW 54206 7/2003
TW M254303 1/2005
TW M255768 1/2005
TW 20062143 A 7/2006
TW M294999 8/2006
TW M298496 10/2006
TW M399777 3/2011
TW M409138 8/2011
TW 201223709 A 6/2012
TW M430342 6/2012
TW I562863 B 12/2016
WO 2001032365 5/2001
WO 03106849 A1 12/2003
WO 2013145697 10/2013
WO 2020225800 A1 11/2020

OTHER PUBLICATIONS

UK Office Action for Application No. GB1420305.3, dated Dec. 1, 2017, 5 pages.
Chinese Office Action for Application No. 201410650734.4, dated Mar. 23, 2016, 10 pages.

(56) References Cited

OTHER PUBLICATIONS

Taiwan Search Report for Application No. 103132135, dated Feb. 21, 2016, 2 pages.
Canadian Office Action for Application No. 2,864,338, dated Feb. 26, 2016, 3 pages.
Australian Examination Report for Application No. 2014224130, dated Jul. 29, 2015, 4 pages.
Great Britain Search Report and Examination Report for Application No. 1420305.3, dated Feb. 27, 2015, 10 pages.
Wurth USA, Automotice Catalog, Section 8 Tools and Shop Supplies, p. 08.0005, Wurth Combination Wrenches With Powerdrive®, Revision Mar. 2011, 3 p.
Wurth, USA, Automotive Catalog, Section 8 Tools and Shop Supplies, p. 08.0025, 1/4" Multi-Use-Socket Set, Revision Mar. 2011, 3 p.
Chinese Office Action for Application No. 202010086816.6 dated Jan. 26, 2021, 13 pages.
Chinese Office Action for Application No. 201710876823.4 dated Apr. 22, 2020, 7 pages.
Examination Report No. 1 Application No. 2019240548 dated Apr. 24, 2020, 4 pages.
United Kingdom Office Action for Application No. GB1713529.4 dated Mar. 13, 2019, 3 pages.
Chinese Office Action for Application No. 2014106507344 dated Feb. 3, 2019, 9 pages.
Chinese First Office Action for Application No. 201710876823.4 dated Oct. 29, 2018, 10 pages.
UK Combined Search and Examination Report for Application No. GB1713529.4 dated Dec. 7, 2018, 6 pages.
Examination Report for United Kingdom Application No. GB1713526.0 dated Sep. 20, 2018, 3 pages.
Taiwan Office Action for Application No. 107107300 dated Jul. 18, 2018, 10 pages.
Australian Office Action for Application No. 2017245464 dated Jun. 19, 2018, 3 pages.
Australian Office Action for Application No. 2017245465 dated Jun. 19, 2018, 4 pages.
UK Office Action for Application No. GB1713526.0 dated May 9, 2018, 5 pages.
UK Office Action for Application No. GB1420305.3 dated Apr. 10, 2018, 3 pages.
Chinese Office Action for Application No. 201410650734.4 dated Jan. 11, 2018, 8 pages.
Canadian Office Action for Application No. 3975449 dated Nov. 30, 2017, 3 pages.
Taiwan Office Action for Application No. 105129382 dated Jul. 20, 2017, 4 pages.
Chinese Office Action for Application No. 201410650734.4 dated Jun. 16, 2017, 8 pages.
Examiner's Report dated Jun. 16, 2017, 3 pages.
Chinese Re-exam Notification for Application No. 201410650734.4 dated Jul. 9, 2019, 9 pages.
Chinese Office Action for Application No. 201710876823.4 dated Jul. 4, 2019, 7 pages.
Chinese Office Action for Application No. 201710876823.4 dated Dec. 9, 2019, 8 pages.
Australian Government Patent Examination Report No. 1 dated Oct. 14, 2016, 3 pages.
Examination Report No. 1 for corresponding Application No. 2021202775 dated Apr. 4, 2022, 4 pages.
Examination Report No. 1 for corresponding Application No. 2021204591 dated Jun. 6, 2022, 2 pages.
Combined Search and Examination Report for corresponding Application No. GB2108959.4 dated Apr. 25, 2022, 8 pages.
Chinese Office Action for corresponding Application No. 202010086816.6 dated Feb. 7, 2022, 7 pages.
Chinese Office Action for corresponding Application No. 202010086816.6 dated Aug. 13, 2021, 3 pages.
Australian Examination Report No. 2 for corresponding AU Application No. 2021202775, dated Nov. 2, 2022, 3 bages.
Canadian Office Action for corresponding CA Application No. 3,124,034, dated Nov. 9, 2022, 5 pages.
United Kingdom Examination Report for corresponding UK Application No. GB2108959.4, dated Nov. 10, 2022, 6 pages.
Taiwan Office Action for corresponding TW Application No. 110124203, dated Dec. 20, 2022, 15 pages.
Examination Report for corresponding Application No. GB2108959.4 dated Feb. 16, 2023, 6 pages.
Fourth Office Action for corresponding Chinese Application No. 2017108768234 dated Feb. 28, 2023, 11 pages.
Examination Report for corresponding United Kingdom Application No. GB2108959.4 dated May 30, 2023, 6 pages.
Examination Report No. 3 for corresponding Application No. 2021204591 dated Jun. 5, 2023, 3 pages.
Fifth Office Action for corresponding Application No. 2017108768234 dated Jun. 5, 2023, 11 pages.
Chinese Office Action for corresponding Application No. 2017108768234 dated Oct. 9, 2023, 11 pages.
United Kingdom Examination Report for corresponding UK Application No. GB2315102.0, dated Jan. 26, 2024, 7 pages.
Taiwan Office Action for corresponding TW Application No. 112102734, dated Jan. 19, 2024, 2 pages.

* cited by examiner

SOCKET DRIVE IMPROVEMENT

CROSS REFERENCES TO RELATED APPLICATIONS

This application is a continuation of, and claims the priority benefit to, U.S. patent application Ser. No. 16/918,712, filed Jul. 1, 2020, which is a continuation-in-part of, and claims the priority benefit to, U.S. patent application Ser. No. 16/504,718, filed Jul. 8, 2019 (now U.S. Pat. No. 11,173,580), which is a continuation of U.S. patent application Ser. No. 15/634,697 (now U.S. Pat. No. 10,442,060), filed Jun. 27, 2017, which is a continuation of U.S. patent application Ser. No. 14/309,954 (now U.S. Pat. No. 9,718,170), filed Jun. 20, 2014, which claims the benefit of U.S. Provisional Patent Application Ser. No. 61/904,754, filed Nov. 15, 2013, the contents of which are incorporated herein by reference in their entirety.

TECHNICAL FIELD

The present application relates generally to tools for driving fasteners, and in particular to sockets and drives for tools.

BACKGROUND

A variety of wrenches and tools are commonly used to apply torque to a workpiece, such as a threaded fastener. The workpiece may be any number of different sizes and shapes and fitments. Accordingly, many tools include a driver adapted to mate with one or more different adapters, such as sockets, to engage and rotate the different workpieces. For example, for a typical bolt having a hex head, inner walls of a hexagonally shaped socket engage the fastener at or very near the corners of the fastener head, thereby allowing the tool to impart torque to the workpiece. However, due to this engagement, the socket may become pre-maturely fatigued and fail due to repeated stress being placed on the socket walls from the corners of the fastener. In addition, upon application of torque to the fastener, the fastener can become frictionally locked in the socket due to minor amounts of rotation of the fastener within the socket or easily stripped due to inadequate head to socket interaction.

SUMMARY

The present application relates to sockets and other tools, for example, hexagon sockets, double hexagon sockets, spline sockets, wrenches, etc. adapted to engage fasteners at a location further from a corner of the fasteners, relative to conventional sockets and tools. By shifting the point of contact or engagement of the socket and fastener head away from the corners of the fastener head, the strength and life of the socket is increased, and the risk of the fastener becoming frictionally locked in the socket or stripped by the socket is decreased.

In an embodiment, a dodecagonal type socket includes an axial bore having a generally dodecagonal cross-section with twelve sidewalls respectively extending between twelve corresponding recesses. Each of the sidewalls includes a first portion and a second portion that are angularly displaced by about 130-140 degrees relative to each other. This geometry of the socket provides for a contact point between the socket and a flank of a head of a dodecagonal type fastener that is a distance of about 75-90 percent of a length of the flank away from a corner of the head of the fastener, thus increasing the surface area of contact and life expectancy of the socket.

In another embodiment, a hexagonal type socket includes an axial bore having a generally hexagonal cross-section with six sidewalls respectively extending between six corresponding recesses. Each of the sidewalls includes a first portion and a second portion that are angularly displaced by about 130-140 degrees relative to each other. This geometry of the socket provides for a contact point between the socket and a flank of a head of a hexagonal type fastener that is a distance of about 30-60 percent of half a length of the flank away from a corner of the head of the fastener, thus increasing the surface area of contact and life expectancy of the socket.

BRIEF DESCRIPTION OF THE DRAWINGS

Embodiments of devices and methods are illustrated in the figures of the accompanying drawings which are meant to be exemplary and not limiting, in which like references are intended to refer to like or corresponding parts, and in which.

DETAILED DESCRIPTION

Figure 1:
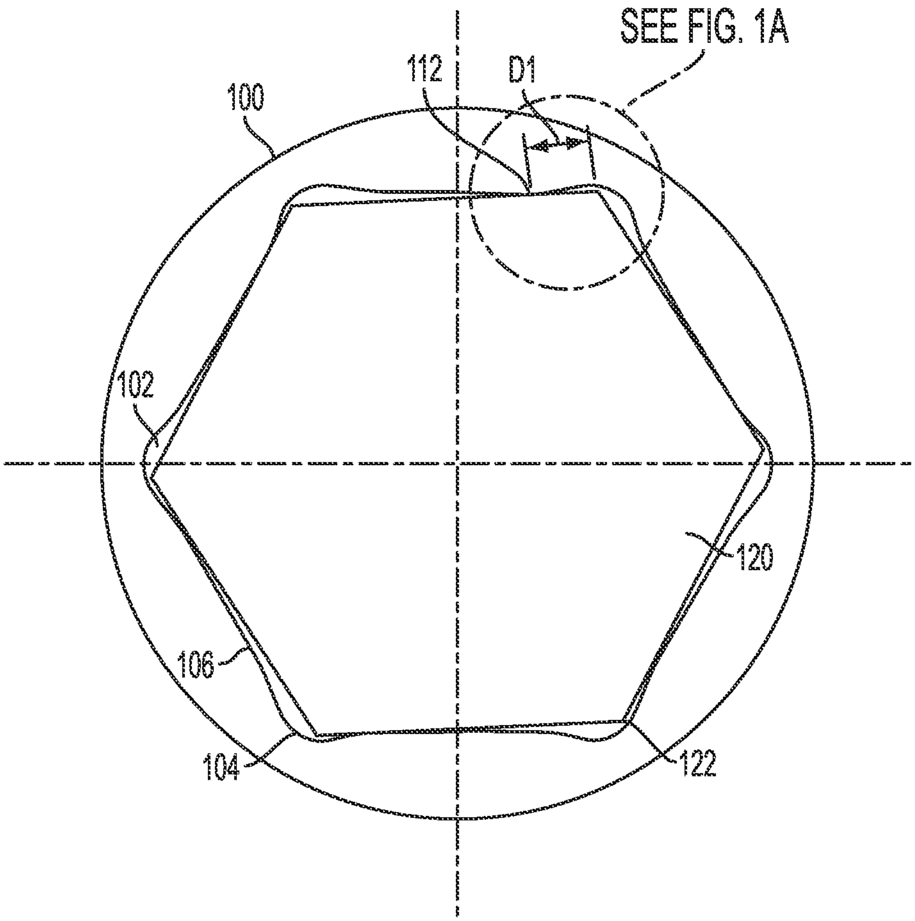
FIG. 1 is a top plan view of a hexagonal socket in accordance with an embodiment of the present application in engagement with a typical hexagonal bolt head or nut.

Detailed embodiments of devices and methods are disclosed herein. However, it is to be understood that the disclosed embodiments are merely exemplary of the devices and methods, which may be embodied in various forms. Therefore, specific functional details disclosed herein are not to be interpreted as limiting, but merely as a basis for the claims and as a representative example for teaching one skilled in the art to variously employ the present disclosure.

The present application relates to tools adapted to engage a head of a fastener, such as a hexagonal nut or bolt (also referred to herein as a fastener head). The tools are adapted to engage fasteners at a point away from a corner of the fasteners, which increases strength and life of the tool, reduces a risk of the fastener becoming frictionally locked or stuck in the tool, and reduces the risk of the fastener being stripped or the tool slipping on the fastener.

In an embodiment, the tools are sockets adapted to mate with lugged wrenches, such as ratchets. In general, the sockets include a body having first and second ends. A first axial bore in the first end is adapted to receive a fastener head, such as a bolt head or nut, and a second axial bore in the second end adapted to matingly engage with a lugged wrench in a well-known manner. The first axial bore may have a polygonal cross-sectional shape axially extending at least partially through the body from the first end toward the second end. In an embodiment, the polygonal cross-sectional shape is a generally hexagonal shape adapted to engage the fastener head, such as a hexagonal bolt head or nut. The hexagonal cross sectional shape may be, for example, about a ½ inch cross sectional shape. In other embodiments, the hexagonal cross sectional shape may be larger or smaller, for example, the cross section shape may be SAE ¼ inch, a ⅜ inch, a ¾ inch, a 1 inch, a 1 and ½ inch, etc. or metric sizes, inclusive of all ranges and sub-ranges there between. In yet other embodiments, the first axial bore may be formed to have different cross-sectional shapes adapted to mate with different shaped fastener heads, for example, triangular, rectangular, pentagonal, heptagonal, octagonal, hex shaped, double hexagonal, spline or other shapes of the type.

The second axial bore may have a substantially square cross-sectional shape extending at least partially through the body from the second end to the first end. The second axial bore may be adapted to matingly engage a drive shaft or drive lug of a tool, for example, a hand tool, a socket wrench, a torque wrench, an impact driver, an impact wrench, and other tools, in a well-known manner. The squared cross-sectional shape may be, for example, about a ½ inch square or other SAE or metric sizes. In yet other embodiments, the second axial bore may be formed to have different cross-sectional shapes adapted to mate with different shaped receptacles of different tools, for example, the cross-sectional shape of the second axial bore may be triangular, rectangular, pentagonal, hexagonal, heptagonal, octagonal, hex shaped or other shapes of the type.

Figure 1A:
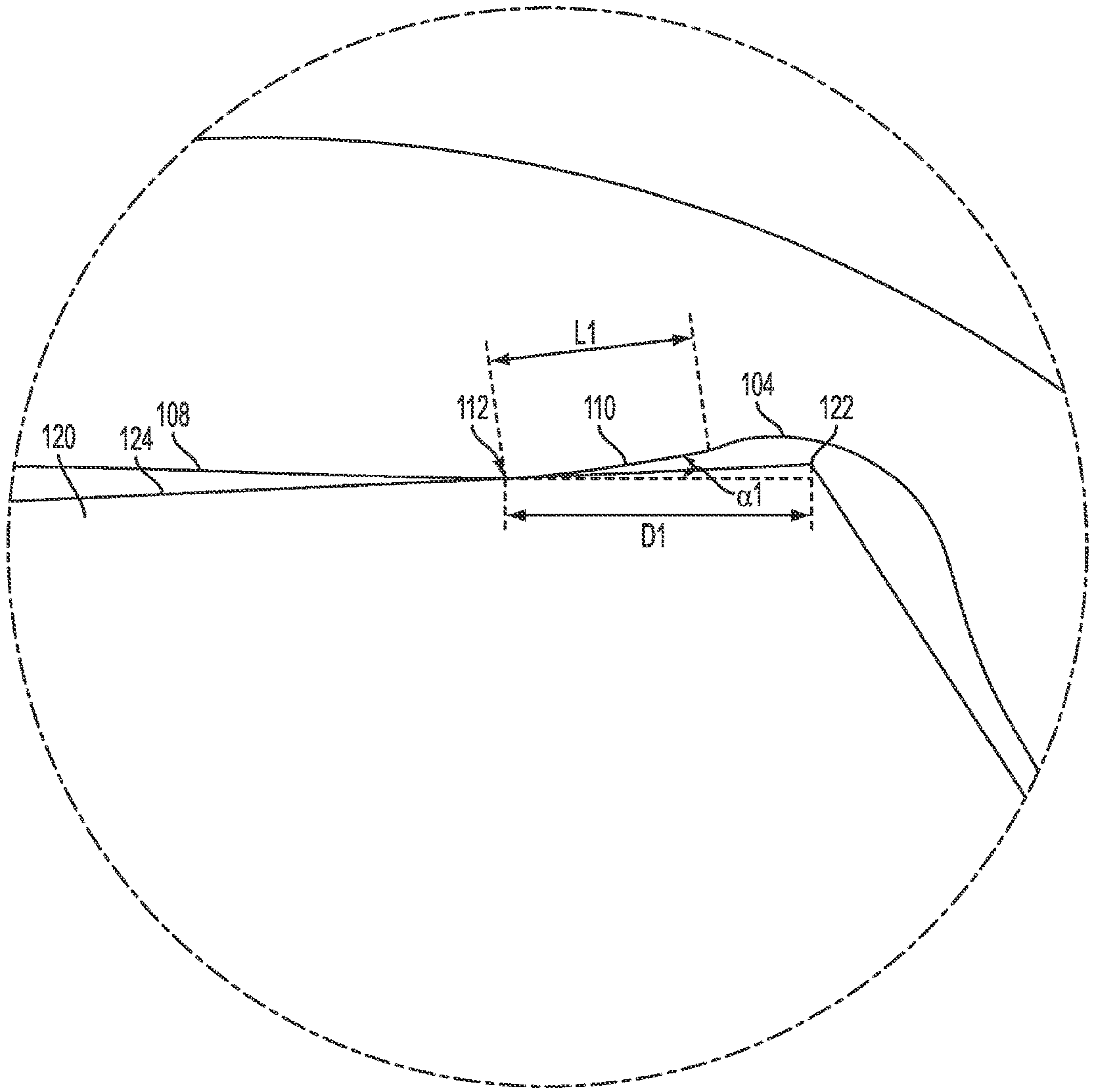
FIG. 1A is an enlarged sectional top plan view of the socket of FIG. 1 in accordance with an embodiment of the present application in engagement with a typical hexagonal bolt head or nut.

FIGS. 1 and 1A illustrate an embodiment of a socket 100 having a first axial bore 102 with a generally hexagonal shape. As illustrated in FIG. 1, the socket 100 is disposed on a typical head 120 of a fastener, such as a hexagonal bolt head or nut.

The first axial bore 102 includes six (6) corresponding recesses 104 equally spaced circumferentially in an inner sidewall of the socket 100. The recesses 104 are equally spaced from one another at about sixty (60) degree intervals circumferentially around the socket 100 so as to receive the corners 122 of the hexagonal head 120 of the fastener. The recesses 104 are dimensioned to provide for about three (3) degrees of rotation off center of the socket 100 with respect to the corners 122 of the head 120 of the fastener in either direction when corners 122 of the head 120 are substantially centrally aligned in the recesses 104.

The first axial bore 102 also includes six (6) longitudinal sidewalls 106 that extend between and are respectively interconnected by the recesses 104. Referring to FIG. 1A, each of the sidewalls 106 (illustrated in FIG. 1) includes a first substantially straight portion 108 disposed adjacent to second straight portion 110 that is angularly displaced with respect to the first portion 108. The second portion 110 extends from a recess 104 and intersects the first portion 108 at an angle. As illustrated in FIG. 1A, the second portion 110 is disposed at an angle ($\alpha$1) with respect to the first portion 108. In an embodiment, the angle ($\alpha$1) is about 4-12 degrees, and preferably about 5-7 degrees. The second portion 110 may also have a length (L1) equal to about 20-30 percent of a length of the first portion 108, and preferably about 26 percent.

This geometry of the first axial bore 102 provides for a contact point 112 between the sidewalls 106 (illustrated in FIG. 1), substantially at an intersection of a second portion 110 with the first portion 108, and a flank 124 or flat of the head 120 of the fastener that is away from the corner 122 of the fastener. As illustrated in FIG. 1A, the contact point 112 is a distance (D1) away from the corner 122. In an embodiment, the distance (D1) is about 30 to 60 percent of half a length of the flank 124 (half of the length between corners 122) of the head 120 of the fastener, more preferably, the distance (D1) is about 40-55 percent of half the length of the flank 124, and more preferably, the distance (D1) is about 45 percent of half the length of the flank 124. It is to be understood that each end of sidewalls 106 intersection around the hexagonal shape is generally the same and mirrored as described above.

Referring to FIGS. 1-1A and 5-5A, when compared to a typical prior art hexagonal socket 500 having six (6) recesses 504 and six (6) longitudinal sidewalls 506, the contact point 112 of the socket 100 is further away from the corner 122 of the head 120 of the fastener than a contact point 512 of the socket 500. When the sockets 100 and 500 are ¾ inch sockets, for example, the contact point 112 of the present invention is at a distance (D1) of about 0.092 inches, compared to the contact point 512 of the prior art having a distance (DP1) of about 0.0548 inches. Additionally, the sidewalls 506 of the prior art socket 500 are merely straight, and do not include second portions, as illustrated in FIGS. 1 and 1A.

The increase in the distance of the contact point 112 away from the corner 122 of the head 120 of the fastener increases the surface area and shifts the load from the corner 122 and distributes the stress concentration further away from the corner 122. This allows more surface area of the sidewall 106 to contact the head 120, thereby improving the strength and operable life of the socket 100. This also reduces the risk of the head 120 becoming frictionally locked or stuck in the socket 100, and reduces the risk of the head 120 being stripped or the socket 100 slipping on the head 120.

Figure 2:
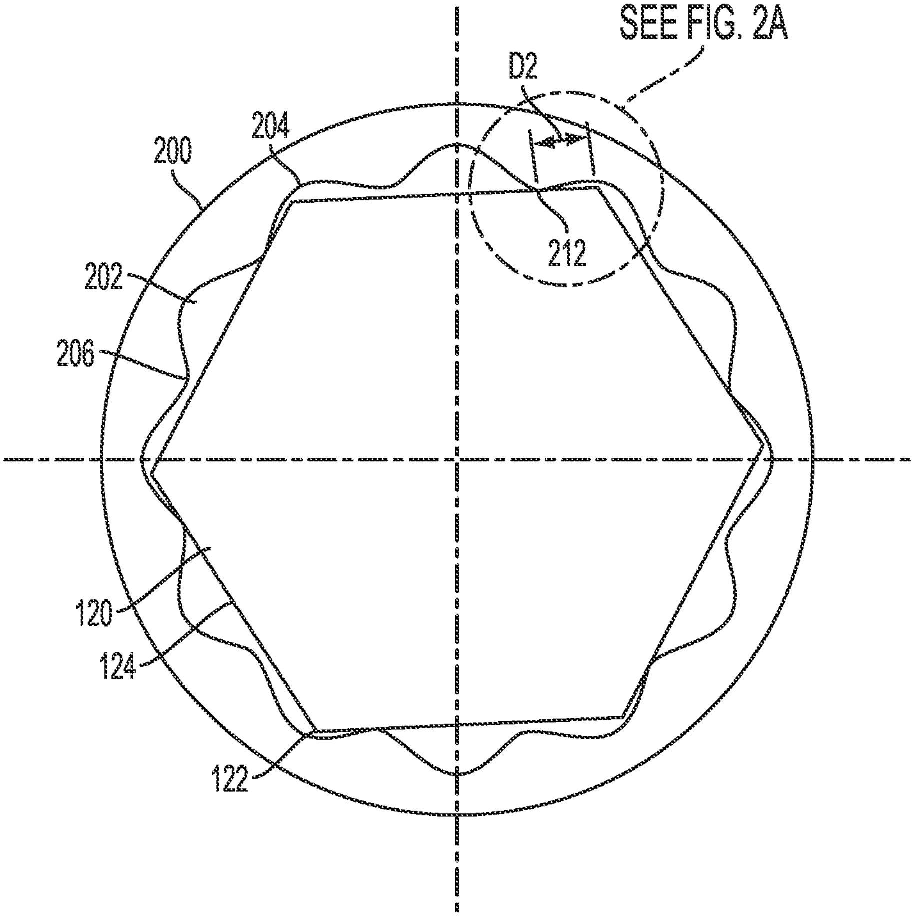
FIG. 2 is a top plan view of a dodecagonal socket in accordance with an embodiment of the present application in engagement with a typical hexagonal bolt head or nut.
Figure 2A:
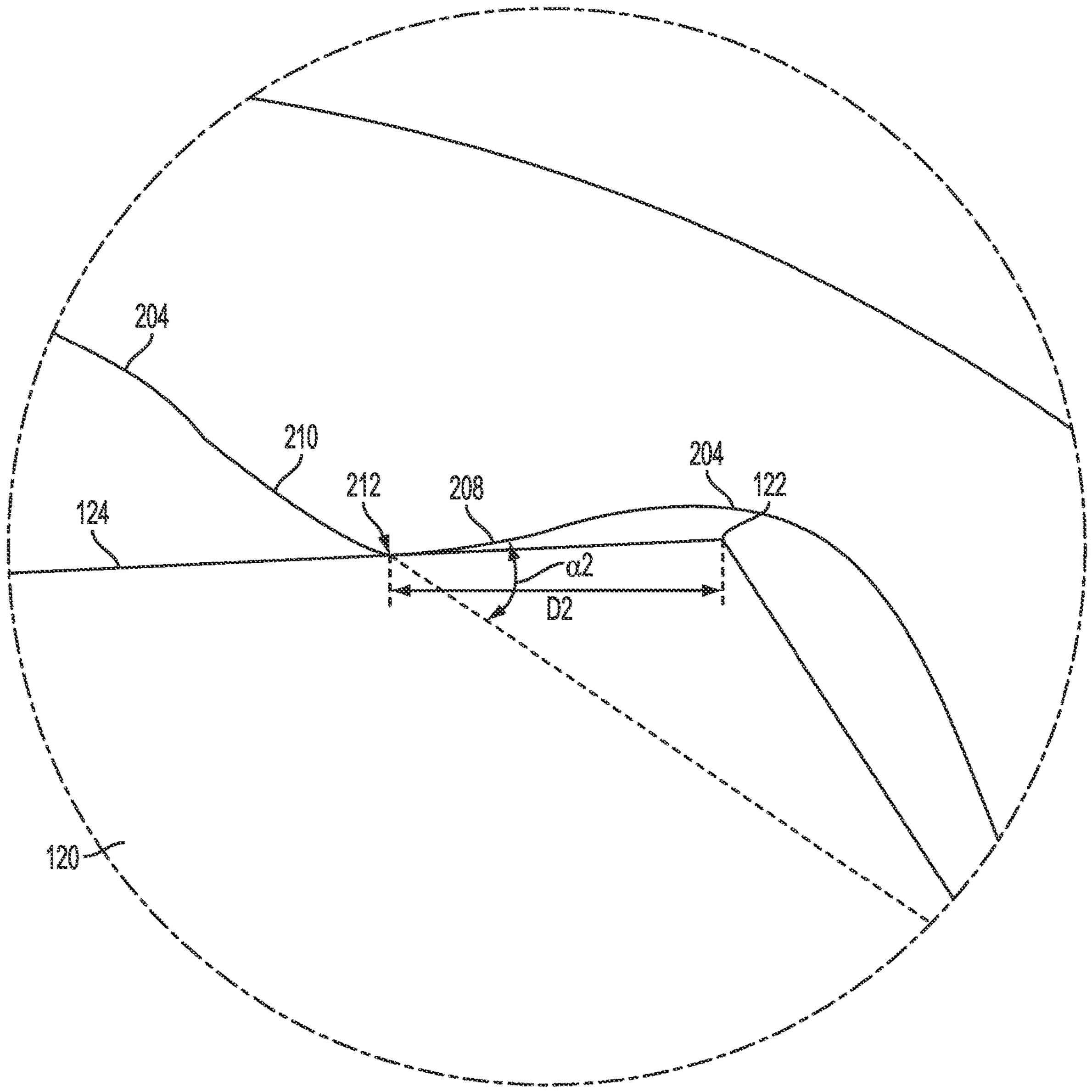
FIG. 2A is an enlarged sectional top plan view of the socket of FIG. 2 in accordance with an embodiment of the present application in engagement with a typical hexagonal bolt head or nut.

FIGS. 2 and 2A illustrate another embodiment of a socket 200 having a first axial bore 202 having a generally dodecagonal type shape (a/k/a double hexagonal). As illustrated in FIG. 2, the socket 200 is disposed on the head 120 of the fastener, such as a hexagonal bolt head or nut. The first axial bore 202 includes twelve (12) corresponding recesses 204 equally spaced circumferentially in an inner sidewall of the socket 200. The recesses 204 are equally spaced from one another at about thirty (30) degree intervals circumferentially around the socket 200 so as to receive the hexagonal head 120 of the fastener. In this embodiment, the recesses 204 are dimensioned to provide about three and six tenths (3.6) degrees of rotation off center of the socket 200 with respect to the head 120 of the fastener in either direction when the corners 122 of the head 120 are substantially centrally aligned in the recesses 204. In another embodiment, the recesses 204 are dimensioned to provide about one and nine tenths (1.9) degrees of rotation off center of the socket 200 with respect to the head 120 of the fastener in either direction when the corners 122 of the head 120 are substantially centrally aligned in the recesses 204.

The first axial bore 202 also includes twelve (12) longitudinal sidewalls 206 respectively between the recesses 204. Referring to FIG. 2A, each of the sidewalls 206 includes a first straight portion 208 and a second straight portion 210 that are angularly displaced with respect to each other. The first and second portions 208, 210 each extend from respective recesses 204 and intersect with one another at an angle. As illustrated in FIG. 2A, the first portion 208 is disposed at an angle ($\alpha 2$) with respect to the second portion 210. In an embodiment, the angle ($\alpha 2$) is about 40-48 degrees, and preferably about 43 degrees. The first and second portions 208 and 210 may also have lengths substantially equal to one another.

This geometry of the axial bore 202 provides for a contact point 212 between the sidewalls 206 substantially at the intersection of the first and second portions 208 and 210 and the flank 124 is away from the corner 122 of the fastener. When in use, the socket 200 initially contacts the flank 124 of the fastener at the contact point 212 and as load increases, a surface area contact between the socket 200 and the flank 124 gradually increases in a direction towards the corner 122 and a recess 204.

As illustrated in FIG. 2A, the contact point 212 is a distance (D2) away from the corner 122. In an embodiment, the distance (D2) is about 30 to 60 percent of half a length of the flank 124 (half of the length between corners 122) of the head 120 of the fastener, and preferably the distance (D2) is about 40 percent of half the length of the flank 124. It is to be understood that each end of sidewalls 208, 210 intersection around the dodecagonal shape is generally the same and mirrored as described above.

Figure 6:
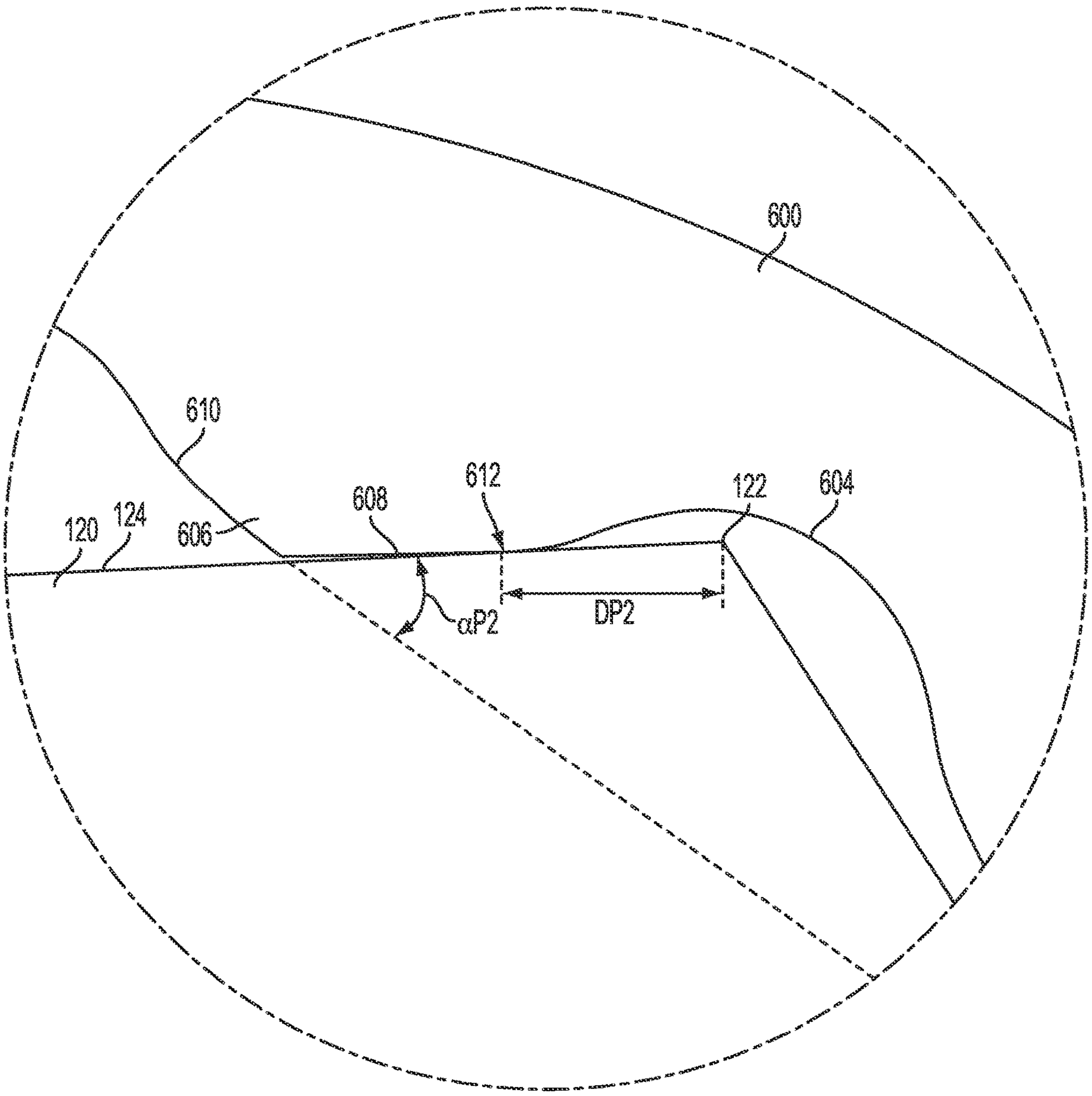
FIG. 6 PRIOR ART
FIG. 6 is an enlarged sectional top plan view of a prior art dodecagonal socket in engagement with a typical hexagonal bolt head or nut.

Referring to FIGS. 2-2A and 6, when compared to a typical prior art dodecagonal type socket 600 having twelve (12) equidistantly spaced recesses 604 and twelve (12) sidewalls 606, the contact point 212 of the socket 200 is further away from the corner 122 of the head 120 of the fastener than a contact point 612 of the socket 600. For example, when the sockets 200 and 600 are ¾ inch sockets, the contact point 112 is at a distance (D2) of about 0.0864 inches and the prior art contact point 612 is at a distance (DP2) less than 0.0864. As illustrated in FIG. 6, the contact point 612 of the socket 600 is proximal to an intersection of a first portion 608 and the recess 604. Additionally, the sidewalls 606 of the prior art socket 600 include first and second portions 608, 610 that are disposed at an angle ($\alpha$P2) of about 36-37 degrees, which is smaller than the angle ($\alpha 2$) of the socket 200.

Figure 3:
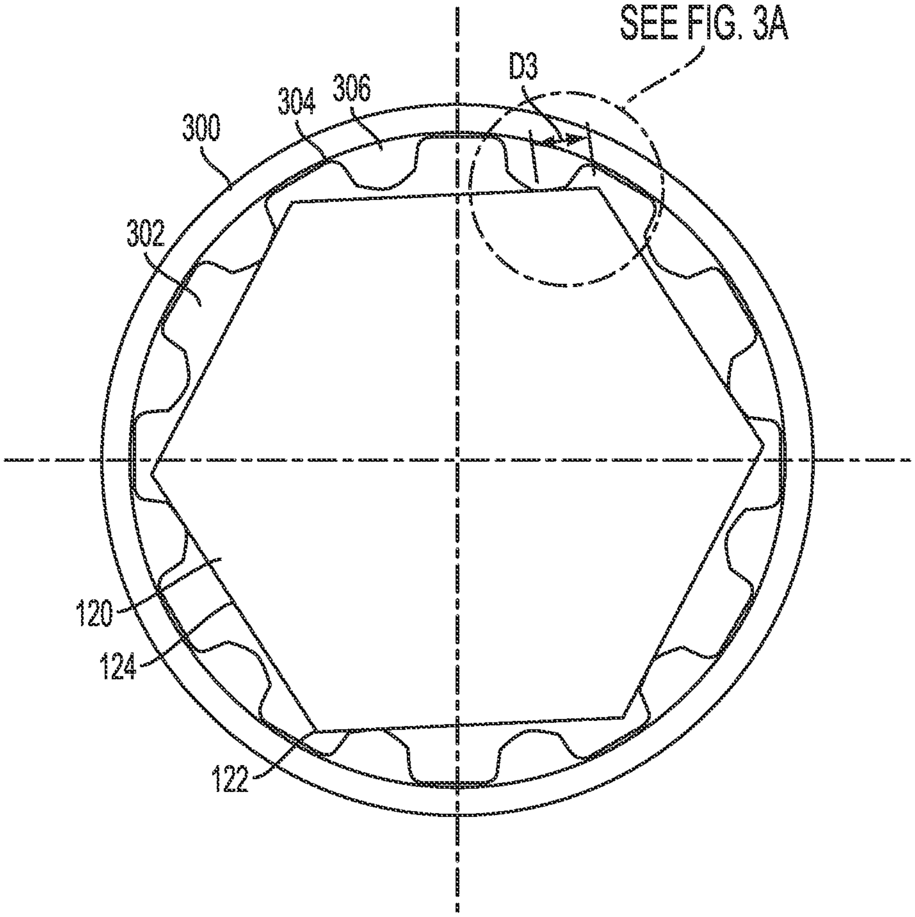
FIG. 3 is a top plan view of a splined socket in accordance with an embodiment of the present application in engagement with a typical hexagonal bolt head or nut.
Figure 3A:
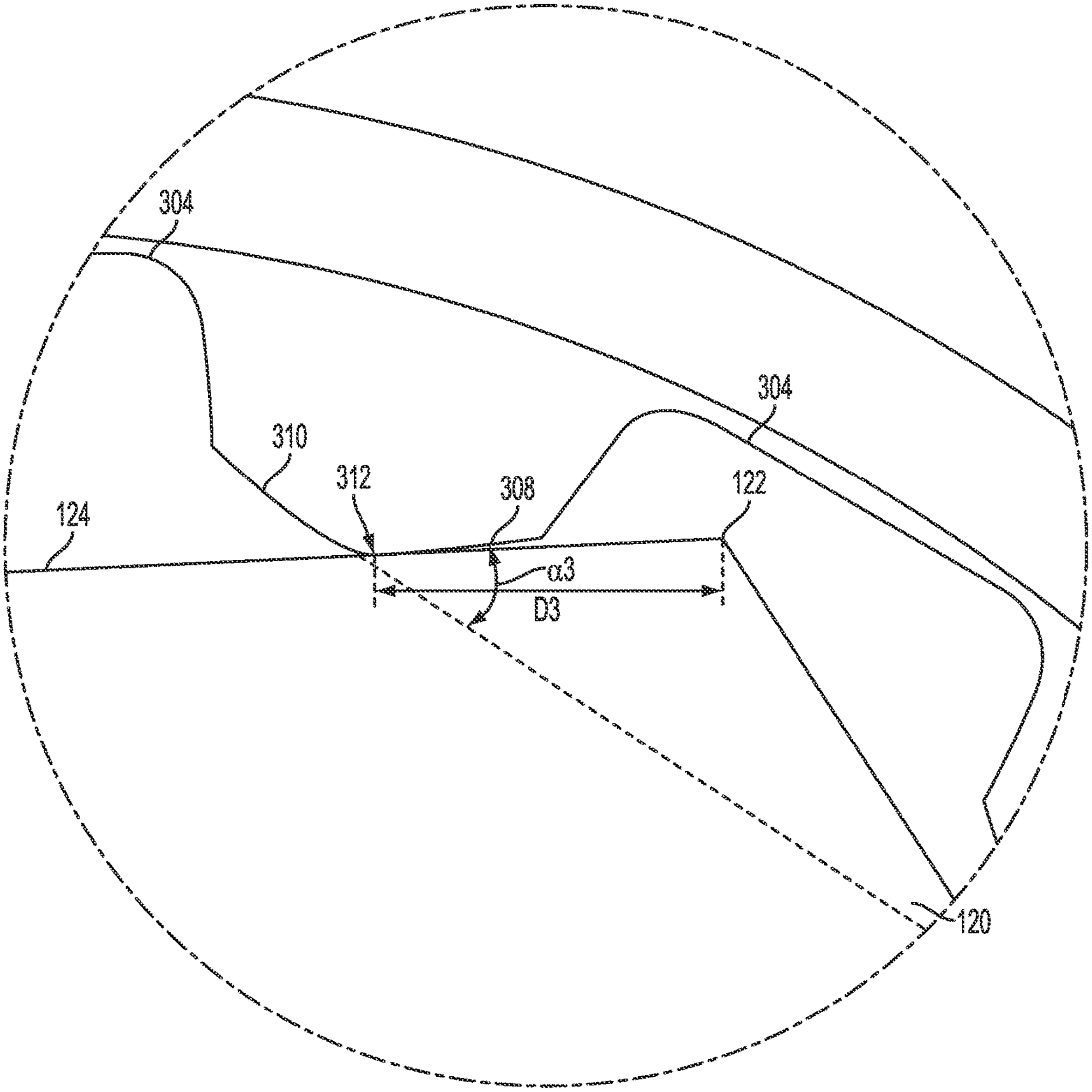
FIG. 3A is an enlarged sectional top plan view of the socket of FIG. 3 in accordance with an embodiment of the present application in engagement with a typical hexagonal bolt head or nut.

FIGS. 3 and 3A illustrate another embodiment of a socket 300 having a first axial bore 302 with a generally splined-type cross-sectional shape. As illustrated in FIG. 3, the socket 300 is disposed on the head 120 of the fastener, such as a hexagonal bolt head or nut. The axial bore 302 includes twelve (12) equidistantly spaced recesses 304 equally spaced circumferentially in an inner sidewall of the socket 300. The recesses 304 are equally spaced from one another at about thirty (30) degree intervals circumferentially around the socket 300 and have two (2) rounded inner corners. In this embodiment, the recesses 304 are dimensioned to provide about three and six tenths (3.6) to about four (4) degrees of rotation off center of the socket 300 with respect to the head 120 of the fastener in either direction when the corners 122 of the head 120 are centrally aligned in the recesses 304.

The axial bore 302 also includes twelve (12) sidewalls 306 respectively between the recesses 304. Referring to FIG. 3A, each of the sidewalls 306 includes a first portion 308 and a second portion 310 that are angularly displaced with respect to each other. The first and second portions 308 and 310 each extend from a recess 304 and intersect with one another at a rounded corner. As illustrated in FIG. 3A, the first portion 308 is disposed at an angle ($\alpha 3$) with respect to the second portion 310. In an embodiment, the angle ($\alpha 3$) is about 40-45 degrees, and preferably about 42 degrees. The first and second portions 308 and 310 may also have lengths substantially equal to one another. It is to be understood that each end of sidewalls 306 intersection around the splined shape is generally the same and mirrored as described above.

This geometry of the axial bore 302 provides for a contact point 312 between the sidewalls 306, proximal to an intersection of the first and second portions 308 and 310, and the flank 124 that is away from the corner 122 of the fastener. When in use, the socket 300 also initially contacts the flank 124 of the fastener at the contact point 312 and as load increases, a surface area contact between the socket 300 and the flank 124 gradually increases in a direction towards the corner 122 and a recess 304.

As illustrated in FIG. 3A, the contact point 312 is a distance (D3) away from the corner 122. In an embodiment, the distance (D3) is about 30 to 60 percent of half a length of the flank 124 (half of the length between corners 122) of the head 120 of the fastener, and preferably the distance (D3) is about 35 percent of half the length of the flank 124.

Figure 4:
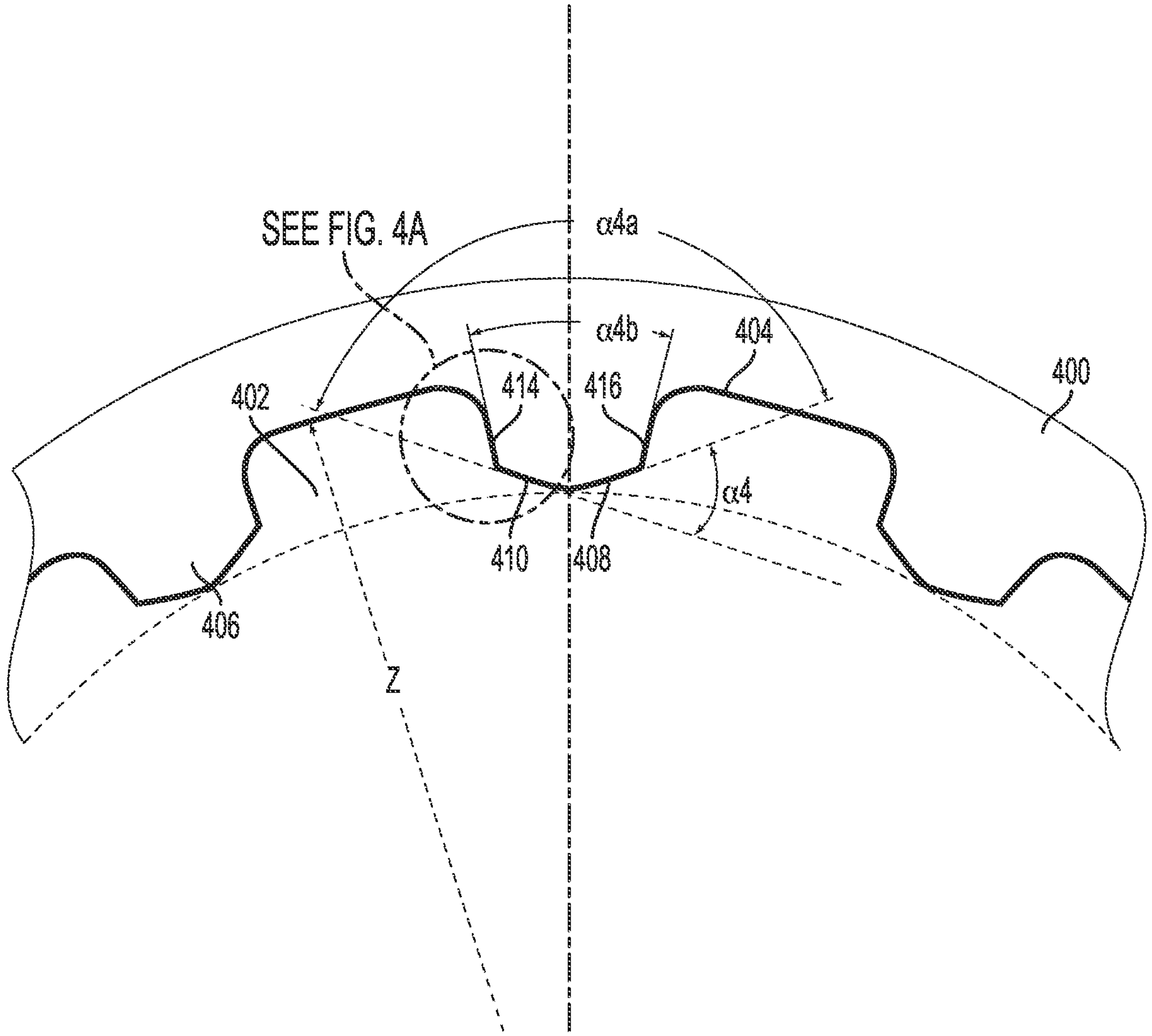
FIG. 4 is an enlarged sectional top plan view of a splined socket in accordance with an embodiment of the present application.
Figure 4A:
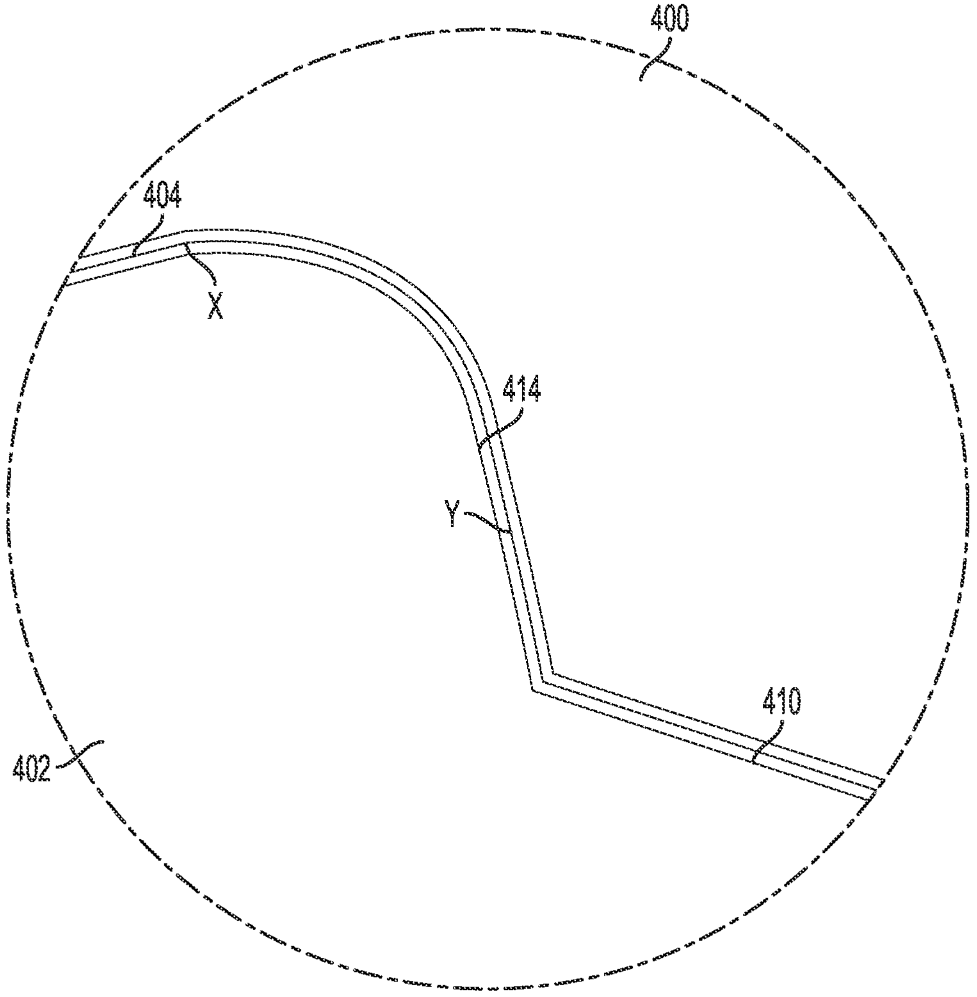
FIG. 4A is an enlarged sectional top plan view of the socket of FIG. 4 in accordance with an embodiment of the present application.
Figure 5:
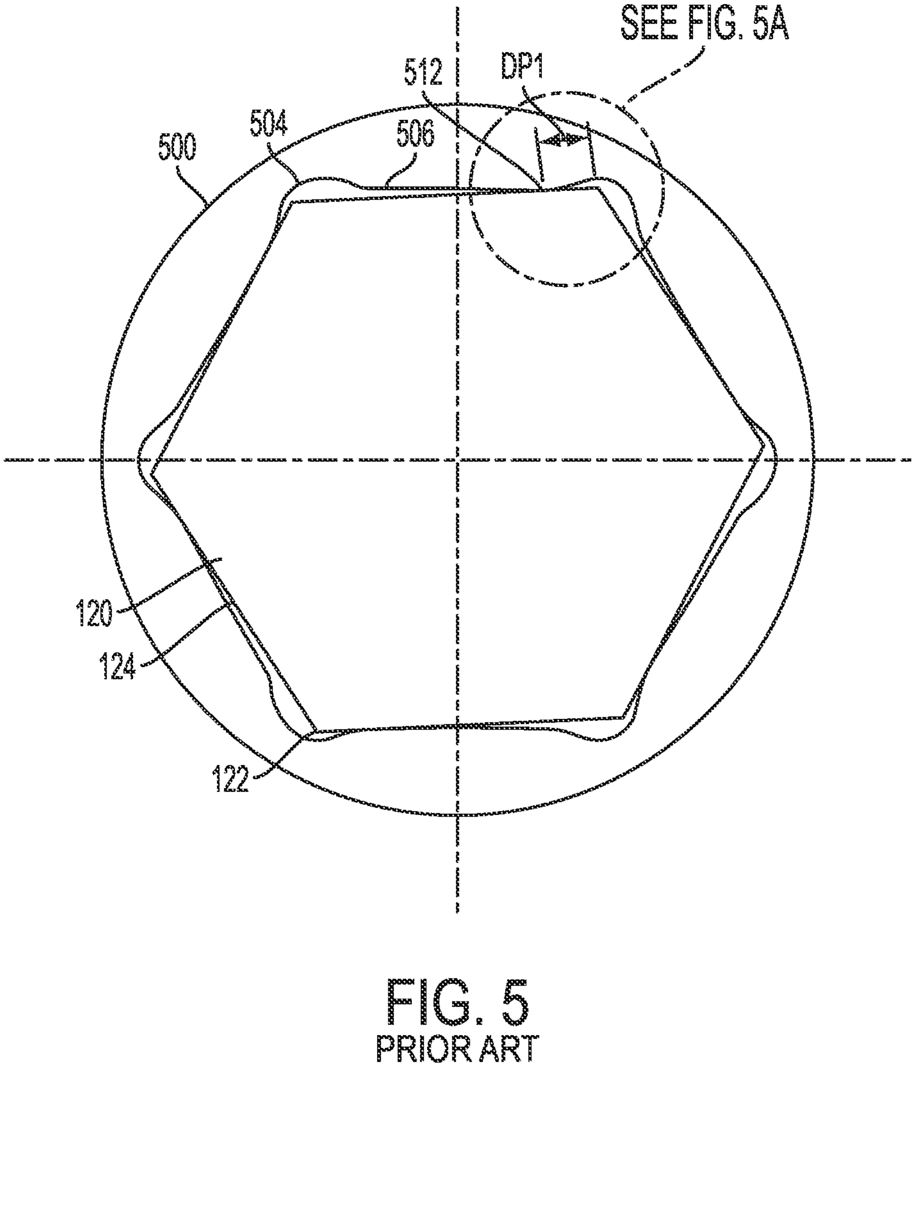
FIG. 5 PRIOR ART
FIG. 5 is a top plan view of a prior art hexagonal socket in engagement with a typical hexagonal bolt head or nut.
Figure 5A:
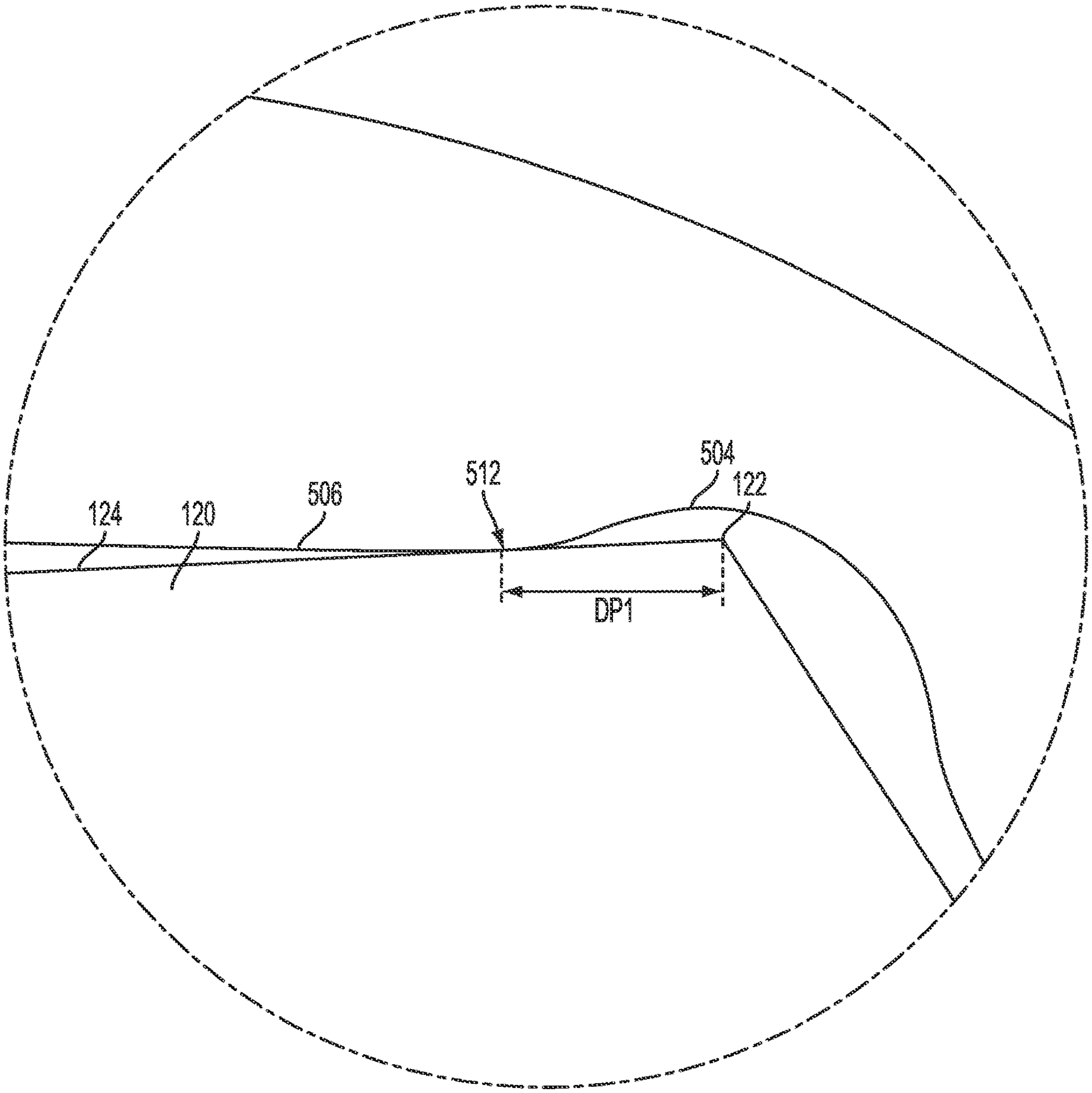
FIG. 5A PRIOR ART
FIG. 5A is an enlarged sectional top plan view of the socket of FIG. 4 in engagement with a typical hexagonal bolt head or nut.

FIGS. 4 and 4A illustrate another socket 400 having a first axial bore 402 having a splined type shape, similar to the socket 300. As illustrated in FIG. 4, the axial bore 402 includes twelve (12) equidistantly spaced recesses 404 equally spaced circumferentially in an inner sidewall of the socket 400. The recesses 404 are equally spaced from one another at about thirty (30) degree intervals circumferentially around the socket 400 and have two (2) rounded inner corners. In this embodiment, similar to the socket 300, the recesses 404 are dimensioned to provide about three and six tenths (3.6) to about four (4) degrees of rotation off center of the socket 400 with respect to the head of a fastener in either direction when the corners of the head are centrally aligned in the recesses 404.

The axial bore 402 also includes twelve (12) sidewalls 406 respectively between the recesses 404. Referring to FIG. 4, each of the sidewalls 406 includes a first portion 408 and a second portion 410 that are angularly displaced with respect to each other. The first and second portions 408 and 410 each extend from a recess 404 and intersect with one another at a rounded corner. As illustrated in FIG. 4, the first portion 408 is disposed at an angle ($\alpha 4$ or $\alpha 4a$) with respect to the second portion 410. In an embodiment, the angle ($\alpha 4$)

is about 40-45 degrees, and preferably about 41.6 degrees, and the angle (α4*a*) is about 140-135 degrees, and preferably about 138.4 degrees. The first and second portions 408 and 410 may also have lengths substantially equal to one another.

In an embodiment, the recesses 404 form angled wall portions 414 and 416 that are angularly displaced with respect to one another at an angle (α4*b*). In an embodiment, the angle (α4*b*) is about 20-24 degrees, and preferably about 22 degrees. Referring to FIG. 4A, additionally, a radius (resulting from an arc tangent to Z at point X and tangent to flank Y) is maximized within the allowable spline geometry of the socket 400. In this embodiment, the width of the teeth (i.e. the sidewalls 406) may be reduced to increase strength of the walls of the socket 400. It is to be understood that each end of sidewalls 406 intersection around the dodecagonal shape is generally the same and mirrored as described above.

Like the socket 300, the geometry of the axial bore 402 may provide for a contact point between the sidewalls 406, proximal to an intersection of the first and second portions 408 and 410, and the flank that is away from the corner of the fastener. Similarly, when in use, the socket 400 may also initially contacts the flank of the fastener at the contact point and as load increases, a surface area contact between the socket 400 and the flank may increase in a direction towards the corner and a recess 404.

Figure 7:
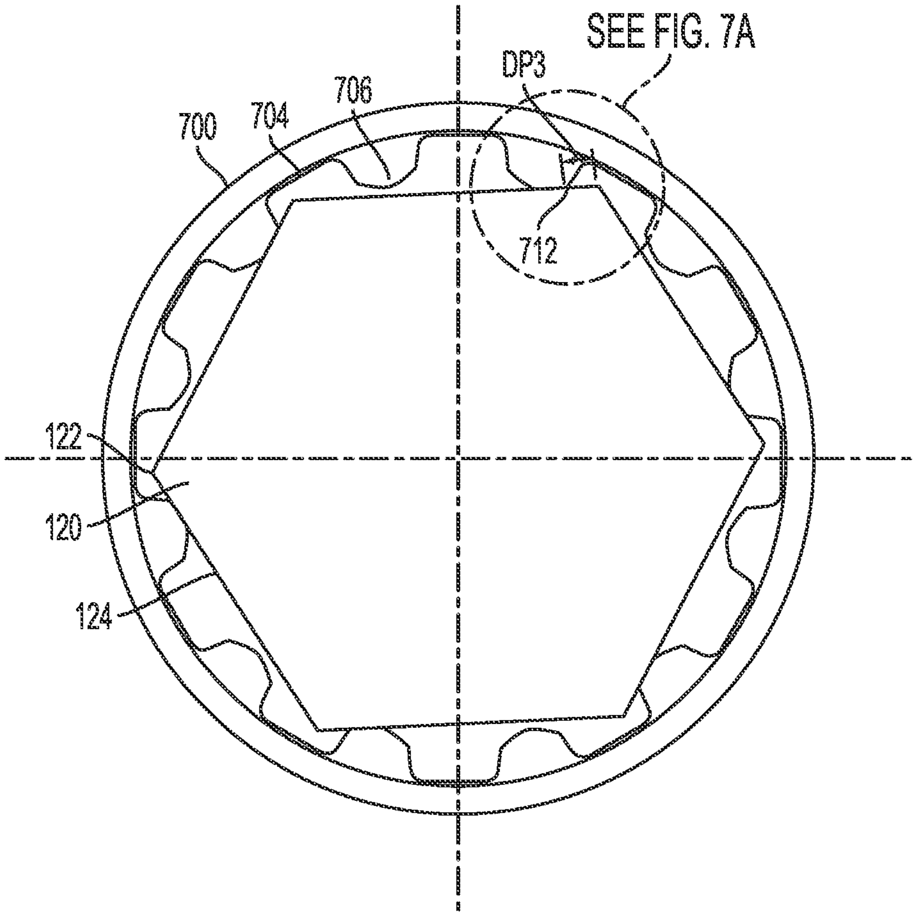
FIG. 7 PRIOR ART
FIG. 7 is a top plan view of a prior art splined socket in engagement with a typical hexagonal bolt head or nut.
Figure 7A:
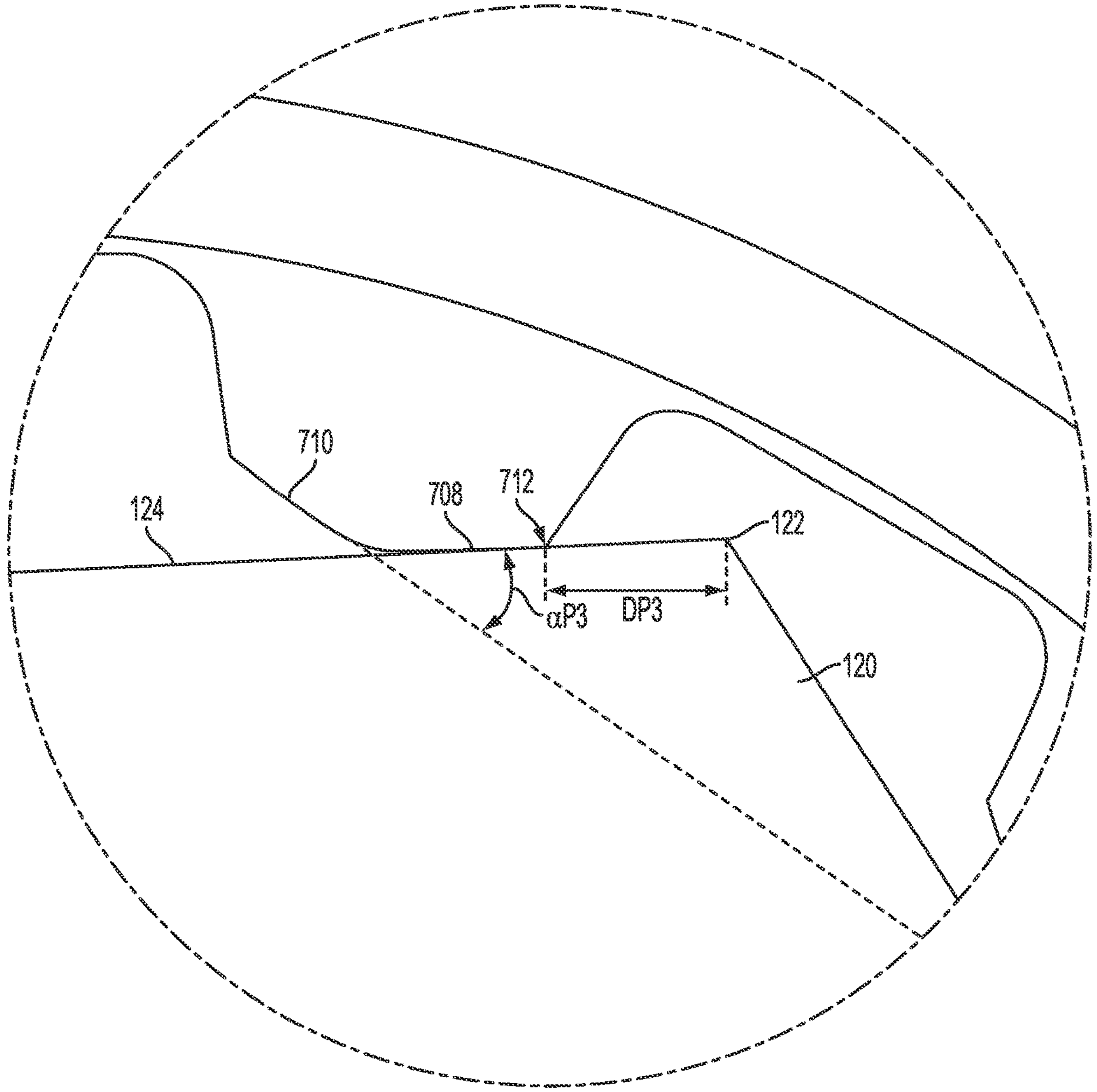
FIG. 7A PRIOR ART
FIG. 7A is an enlarged sectional top plan view of the socket of FIG. 6 in engagement with a typical hexagonal bolt head or nut.

Referring to FIGS. 3-4 and 7-7A, when compared to a typical prior art splined type socket 700 having twelve (12) equidistantly spaced recesses 704 and twelve (12) sidewalls 706, the contact point 312 of the socket 300 and the contact point of the socket 400 is further away from the corner 122 of the head 120 of the fastener than a contact point 712 of the socket 700. For example, when the sockets 300 and 700 are ¾-inch sockets, the contact point 312 is at a distance (D3) of about 0.076 inches and the contact point 712 of the prior art socket is at a distance (DP2) of about 0.0492. As illustrated in FIG. 7A, the contact point 712 of the socket 700 is proximal to an intersection of a first portion 708 and the recess 704. Additionally, the sidewalls 706 of the prior art socket 700 include first and second portions 708 and 710 that are disposed at an angle (αP3) of about 36-37 degrees, which is smaller than the angle (α3) of the socket 300 and the angle (α4) of the socket 400.

Figure 8:
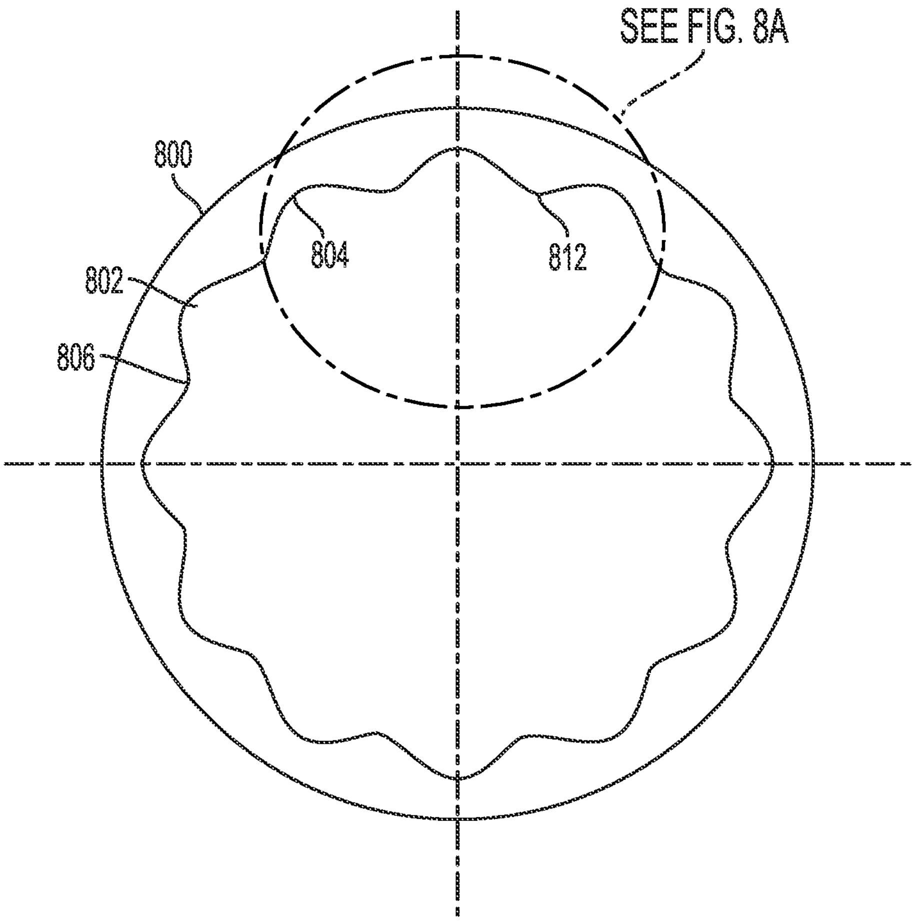
FIG. 8 is a top plan view of another dodecagonal socket in accordance with an embodiment of the present application.
Figure 8A:
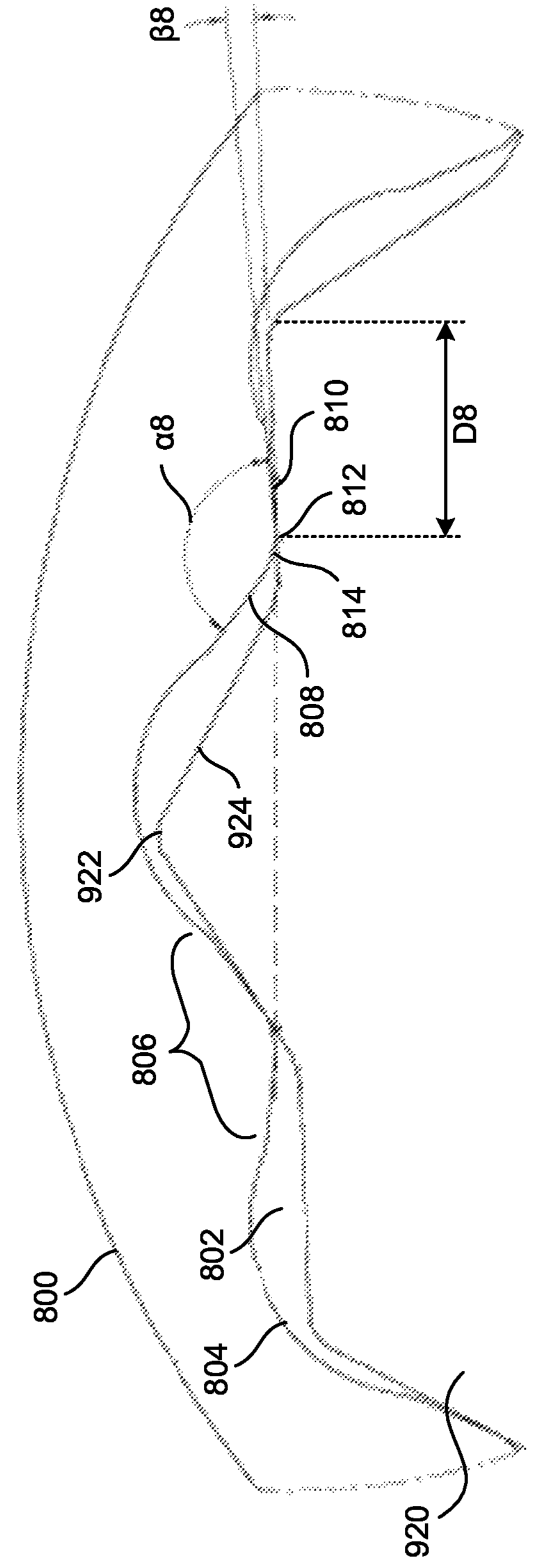
FIG. 8A is an enlarged sectional top plan view of the socket of FIG. 8 in accordance with an embodiment of the present application in engagement with a typical dodecagonal bolt head or nut.

FIGS. 8 and 8A illustrate another embodiment of a socket 800 having a first axial bore 802 with a generally dodecagonal type shape (a/k/a double hexagonal). As illustrated in FIG. 8A, the socket 800 is disposed on the head 920 of a typical fastener, such as a dodecagonal type (a/k/a double hexagonal) bolt head or nut. The first axial bore 802 includes twelve (12) equidistantly spaced corresponding recesses 804 equally spaced circumferentially in an inner sidewall of the socket 800. The recesses 804 are equally spaced from one another at about thirty (30) degree intervals circumferentially around the socket 800 so as to receive the head 920 of the fastener. In this embodiment, the recesses 804 are dimensioned to provide about zero and five tenths (0.5) to about four (4) degrees, and more preferably about one and nine tenths (1.9) degrees of rotation off center of the socket 800 with respect to the head 920 of the fastener in either direction when the corners 922 of the head 920 are substantially centrally aligned in the recesses 804.

The first axial bore 802 also includes twelve (12) sidewalls 806 respectively between adjacent ones of the recesses 804 (such as first and second adjacent recesses). Referring to FIG. 8A, each of the sidewalls 806 includes a first portion 808 and a second portion 810 that are angularly displaced with respect to each other. The first and second portions 208, 210 each respectively extends from recesses 804 and are angled with one another. As illustrated in FIG. 8A, the first portion 808 is disposed at an angle (α8) with respect to the second portion 810. In an embodiment, angle (α8) is about 130-140 degrees, and preferably about 133-136 degrees. In other words, the first portion 808 is disposed at an angle of about 40-50 degrees, and preferably about 44-47 degrees, with respect to the second portion 810.

The first and second portions 808 and 810 may also have lengths substantially equal to one another, and may be substantially straight. The sidewall 806 may also include a third portion 814 between the first and second portions 808, 810. The third portion 814 may be a concave surface sized to fit, but not interfere with a minor diameter of the fastener. The intersection where the third portion 814 intersects the flank 924 creates a contact point 812. In an embodiment, the concave third portion 814 has a radius of about 51% to about 54%, and more particularly, about 52% to about 53% of a nominal hex size. In an alternative embodiment, the third surface 814 may be substantially straight.

This geometry of the axial bore 802 creates the contact point 812 between the sidewalls 806 proximal to the intersection of the first and second portions 808 and 810 (such as substantially at the third portion 814) and the flank 924 away from the corner 922 of the fastener. When in use, the socket 800 initially contacts the flank 924 of the fastener at the contact point 812 and, as torque load application increases, a surface area contact between the socket 800 and the flank 924 gradually increases in a direction towards the corner 922 and a recess 804. The geometry of the axial bore 802 also provides for an angle (β8) between either of the first or second portion 808, 810 and the flank 924. In an embodiment, the angle (β8) is about 2-8 degrees, and preferably about 5-7 degrees.

As illustrated in FIG. 8A, the contact point 812 is a distance (D8) away from the corner 922. In an embodiment, the distance (D8) is about 75-90 percent of a length of the flank 924, and preferably the distance (D8) is about 80-85 percent of the length of the flank 924. With respect to a hexagonal fastener, the distance (D8) is about 30-60 percent of half a length of the flank 124 away from the corner 122, and preferably the distance (D8) is about 49-54 percent of half the length of the flank 124. It is to be understood that each end of sidewalls 806 around the dodecagonal shape is generally the same and mirrored as described above.

The increase in the distance of the contact points away from the corner of the head of the fastener, described with reference to FIGS. 1-4A and 8-8A, shifts the load on the corner and distributes the stress concentration away from the corner of the fastener. This allows more surface area of the sockets to contact the head of the fastener, thereby improving the strength and operable life of the sockets. This also reduces the risk of the head becoming locked or stuck in the sockets, and reduces the risk of the head being stripped or the sockets slipping on the head. Moving the contact point away from the corner of the fastener also allows the sockets to be used on damaged or stripped fasteners where existing sockets cannot.

The sockets described herein are described generally with respect to a ¾ inch socket; however, the sizes and dimensions of the various elements of the socket described herein may be modified or adapted for a particular use with one or more different tools. For example, the socket may be adapted to receive different fastener sizes, for example, 1 inch, ½ inch, 10 mm, 12 mm, 14 mm, etc., as known in the art.

Similarly, the size of the second axial bore can be adapted to receive different sizes and types of drive shafts or drive lugs of socket wrenches.

Further, the geometry of the inner surface of the sockets described herein may be applied to other types of tools for applying torque to fasteners. For example, a wrench or box wrench may include the geometries disclosed herein to allow the wrench or box wrench to have a contact point positioned away from a corner of a fastener. Similarly, other tools and/or fasteners may include the geometries disclosed herein.

Although the devices and methods have been described and illustrated in connection with certain embodiments, many variations and modifications will be evident to those skilled in the art and may be made without departing from the spirit and scope of the present disclosure. The present disclosure is thus not to be limited to the precise details of methodology or construction set forth above as such variations and modification are intended to be included within the scope of the present disclosure. Moreover, unless specifically stated any use of the terms first, second, etc. do not denote any order or importance, but rather the terms first, second, etc. are merely used to distinguish one element from another.

What is claimed is:

1. A tool adapted to engage a dodecagonally shaped head of a fastener having corners and flanks that respectively extend between two corners, the tool comprising:

a surface having recesses and sidewalls, wherein each of the sidewalls extends between two adjacent recesses and includes substantially straight first and second portions that are angularly disposed by about 130 to 140 degrees relative to each other and that respectively have lengths that are substantially equal, and a third portion that is concave and disposed between the first and second portions, wherein each of the recesses is adapted to receive one of the corners of the head and allows about 1.9 degrees of rotation of the tool relative to the head in opposing first and second directions when the corner is substantially centrally aligned in the recess, and wherein each of the sidewalls includes a contact point that is adapted to abut one of the flanks of the fastener head.

2. The tool of claim 1, wherein the contact point is adapted to abut the flank at a distance of about 75 to 90 percent of a length of the flank away from one of the corners.

3. The tool of claim 2, wherein the contact point is adapted to abut the flank at a distance of about 80 to 85 percent of the length of the flank away from one of the corners.

4. The tool of claim 1, wherein the first and second portions are angularly disposed by about 133 to 136 degrees relative to each other.

5. The tool of claim 1, wherein the contact point is substantially disposed at the third portion.

6. The tool of claim 1, wherein the third portion has a radius of about 51 percent to about 54 percent of a nominal hex size.

7. The tool of claim 6, wherein the third portion has a radius of about 52 percent to about 53 percent of the nominal hex size.

8. The tool of claim 1, further comprising a socket body having an axial bore, and wherein the surface is an inner surface disposed in the axial bore.

9. The tool of claim 8, wherein the axial bore provides for an angle of about 2 degrees to about 8 degrees between one of the first and second portions and the flank.

10. The tool of claim 9, wherein the angle is about 5 degrees to about 7 degrees.

11. The tool of claim 1, wherein the surface is disposed on a wrench body.

12. The tool of claim 1, wherein the surface includes 12 equidistantly spaced recesses and 12 sidewalls.

13. A tool adapted to engage a hexagonally shaped head of a fastener having corners and flanks that respectively extend between two corners, the tool comprising:

a surface having recesses and sidewalls, wherein each of the sidewalls extends between two adjacent recesses and includes substantially straight first and second portions that are angularly disposed by about 130 to 140 degrees relative to each other and that respectively have lengths that are substantially equal, and a third portion that is concave and disposed between the first and second portions, wherein each of the recesses is adapted to receive one of the corners of the head and allows about 1.9 degrees of rotation of the tool relative to the head in opposing first and second directions when the corner is substantially centrally aligned in the recess, and wherein each of the sidewalls includes a contact point that is adapted to abut one of the flanks of the fastener head.

14. The tool of claim 13, wherein the contact point is adapted to abut the flank at a distance of about 30 to 60 percent of half a length of the flank away from one of the corners.

15. The tool of claim 14, wherein the contact point is adapted to abut the flank at a distance of about 49 to 54 percent of half the length of the flank away from one of the corners.

16. The tool of claim 13, wherein the first and second portions are angularly disposed by about 133 to 136 degrees relative to each other.

17. The tool of claim 13, wherein the contact point is substantially at the third portion.

18. The tool of claim 13, wherein the third portion has a radius of about 51 percent to about 54 percent of a nominal hex size.

19. The tool of claim 18, wherein the third portion has a radius of about 52 percent to about 53 percent of the nominal hex size.

20. The tool of claim 13, further comprising a socket body having an axial bore, and wherein the surface is an inner surface disposed in the axial bore.

21. The tool of claim 20, wherein the axial bore provides for an angle of about 2 degrees to about 8 degrees between one of the first and second portions and the flank.

22. The tool of claim 21, wherein the angle is about 5 degrees to about 7 degrees.

23. The tool of claim 7, wherein the surface is disposed on a wrench body.

24. The tool of claim 13, wherein the surface includes 12 equidistantly spaced recesses and 12 sidewalls.

* * * * *